United States Patent [19]

Osborne

[11] 4,278,315

[45] Jul. 14, 1981

[54] SYSTEM FOR INTERCONNECTION OF MULTIPLE INSULATED WIRES

[75] Inventor: Brian T. Osborne, Kanata, Canada

[73] Assignee: Northern Telecom Limited, Montreal, Canada

[21] Appl. No.: 55,217

[22] Filed: Aug. 20, 1979

[51] Int. Cl.³ .............................................. H01R 9/00
[52] U.S. Cl. ............................ 339/113 B; 339/198 R; 339/198 GA; 361/428
[58] Field of Search .......... 339/113 B, 198 R, 198 G, 339/198 GA, 198 H; 174/72 A; 361/426, 428; 179/98

[56] References Cited

U.S. PATENT DOCUMENTS

| 3,082,984 | 3/1963 | Larsson et al. | 174/72 A |
| 3,417,368 | 12/1968 | Norden | 339/198 R |
| 3,576,520 | 4/1971 | Stauffer | 339/198 G |
| 3,957,335 | 5/1976 | Troy | 339/198 R |

FOREIGN PATENT DOCUMENTS

| 2114189 | 10/1972 | Fed. Rep. of Germany | 361/428 |
| 1210338 | 10/1970 | United Kingdom | 179/98 |

*Primary Examiner*—Neil Abrams
*Attorney, Agent, or Firm*—Achmed N. Sadik

[57] ABSTRACT

A modular system for interconnecting multiple insulated wires contained in a plurality of cables includes as basic elements: a module having a channel-like base member, two support members one each side of the channel for releasably supporting a plurality of connector blocks thereacross, a plurality of designation strips supported between said conductor blocks between said support members and split distribution rings for guiding cables and wires and acting as spacers between modules.

7 Claims, 15 Drawing Figures

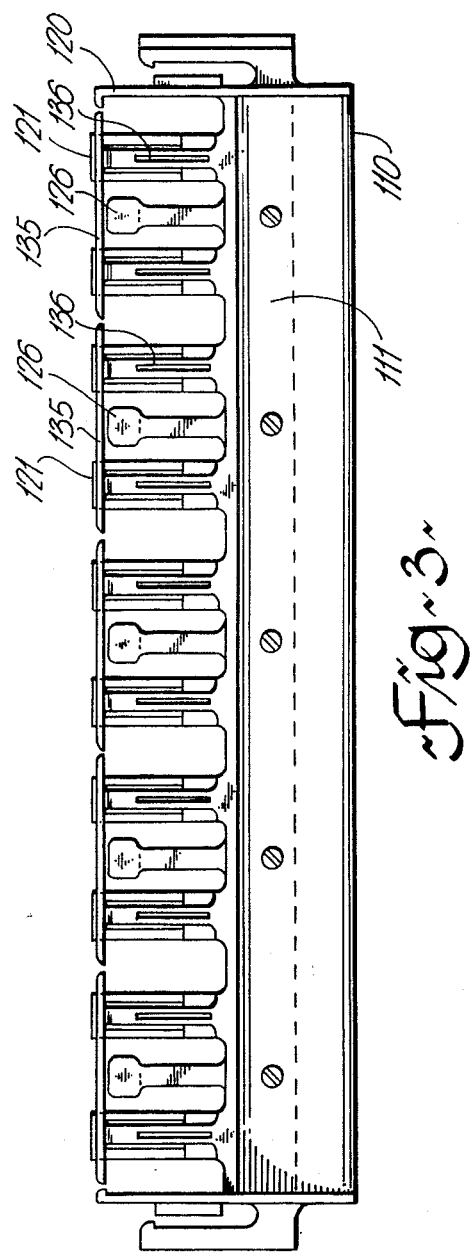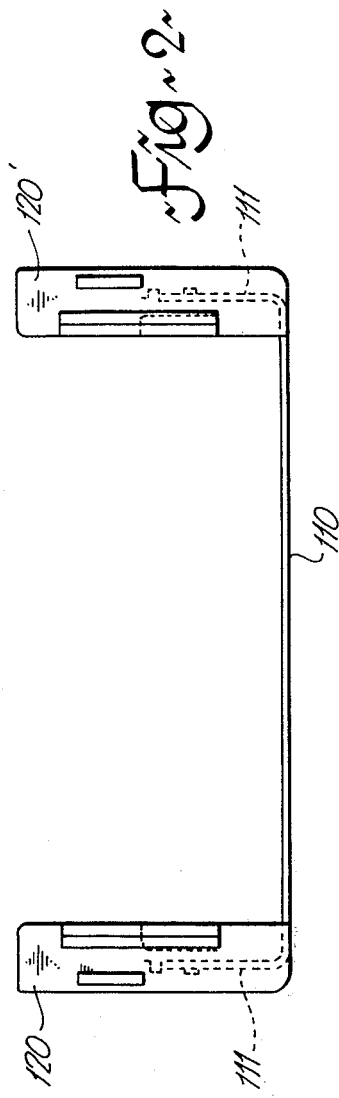

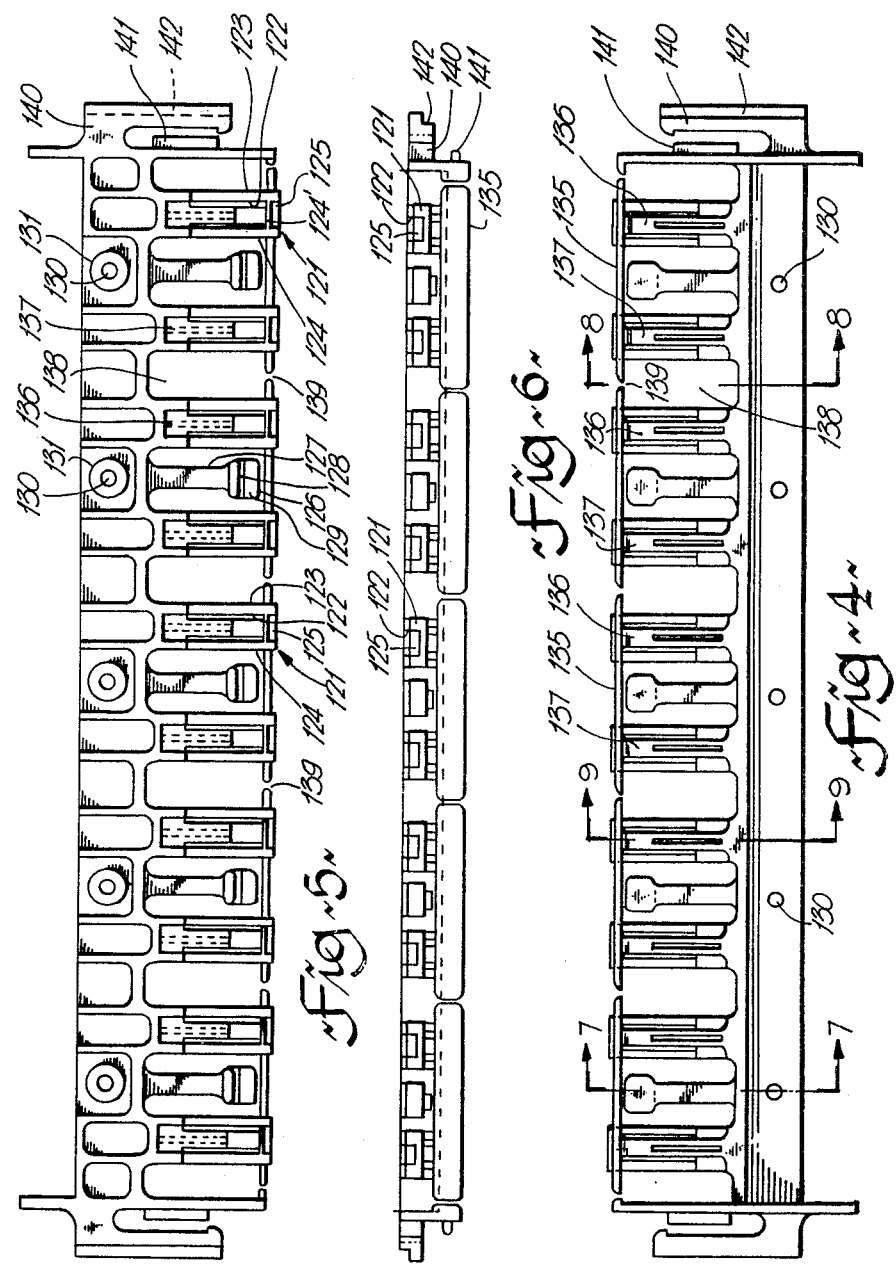

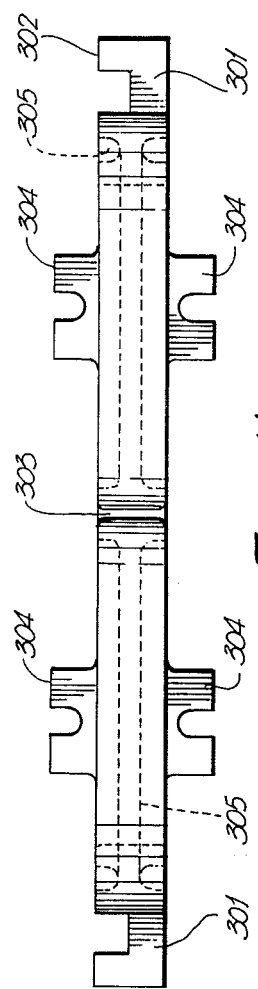
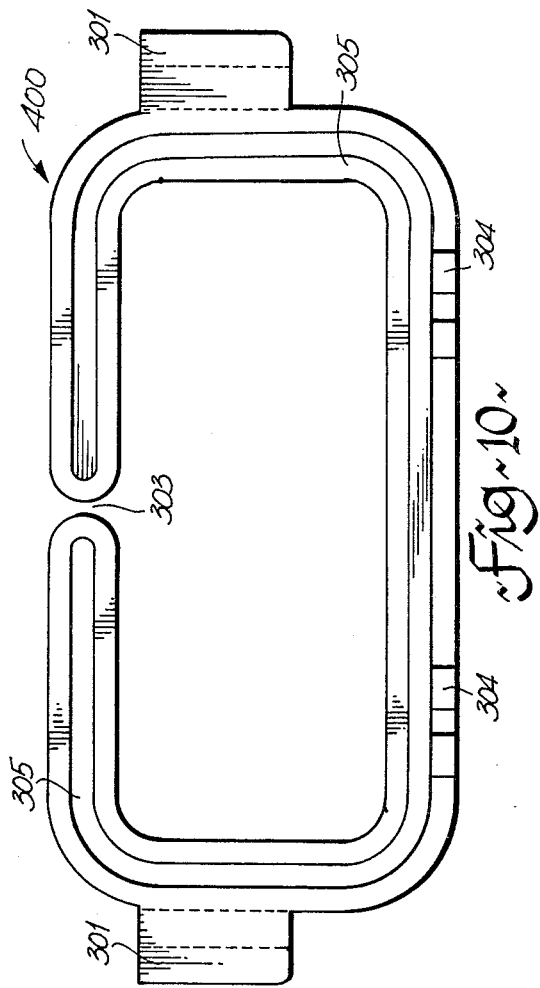

SYSTEM FOR INTERCONNECTION OF MULTIPLE INSULATED WIRES

FIELD OF THE INVENTION

The present invention relates to systems for interconnecting two or more sets of cables. More particularly, the novel system is suitable for interconnecting feeder cable, in-building distribution cable, telephone equipment and set cables.

BACKGROUND OF THE INVENTION

In telecommunications systems a growing number of interconnections between incoming feeder cable from switching centres and in-building distribution cable, and between telephone set cables and the business communications equipment is made annually. Quick clip connectors were developed to avoid cumbersome wire connecting operations which were time consuming. But beyond the operation of actual connection of the wires to connectors, there remains the overall organization of the interconnect system.

To be truly useful the connector blocks must be organized in an easily accessible, expandable interconnection system. Caveney et al in U.S. Pat. No. 3,778,750 issued Dec. 11, 1973 discloses a wire termination and splicing system having a pair of upstanding frame members upon which two series of elongated, two sided, multi-contact connectors are mounted for rotation between pairs of rotational mounts. Ellis et al in U.S. Pat. No. 3,798,587 discloses a connector engaging a protruding receptacle which is mounted on a back panel. The wires to be connected must be laid into the receptacle prior to the connector engaging it.

The system disclosed by Caveney et al must be free standing to permit access to all four sides of the frame, which can under certain circumstances be disadvantageous. The patent to Ellis et al does not teach an organized system for interconnection.

There is need for a system that permits ease of installation, rearrangement and expansion. It is an object of the present invention to provide such improved interconnection system.

It is a feature of the present system that it is structured in simple modular units that are relatively compact. This results in a system that is easy to install, rearrange and expand.

The system, when fully installed, comprises four basic modular components: a supporting module; a connector block; a designation strip; and a distribution ring. The module is of a novel design and holds a plurality of connector blocks and designation strips.

The connector blocks are releasably held by the module so that the first set of wires can be connected to the connector block along one side, the connector block released from the mount and reinserted into the mount with other side accessible for connection of the second set of wires. The mount also provides, if desired, separate paths for incoming and outgoing cables and for jumper wires, thus ensuring a neat arrangement and easy identification of the cable.

The distribution ring interlocks with the mount and is preferably used as a spacer between rows of modules and as a jumper wire guide.

A suitable connector block and its accessories are fully disclosed in commonly assigned co-pending application Ser. No. 963,935 filed on Nov. 27, 1978 in the United States.

Thus according to the present invention, there is provided a module for supporting a plurality of connector blocks comprising a U-shaped channel-like member adapted at its two opposite U-sides to releasably hold each of said plurality of connector blocks thereacross and having in at least one of said two opposite sides fanning apertures for inserting wires for connection to said connector blocks.

A system according to the present invention comprises a plurality of the aforesaid modules arranged in rows and secured to a flat surface such as a back panel or wall. The rows may be separated by an arbitrary distance to permit running of jumper wires accessing the connector blocks through the fanning apertures. The incoming and/or outgoing cable preferably accesses the connector blocks through the channel-like module in the space between the back of the module (the bottom of the U) and the therefrom sufficiently spaced connector blocks.

It is preferable, for organizational purposes, to have two distinct sets of modules, one set accessed by the incoming cables and the other by the outgoing cables. Interconnection between the two sets is accomplished by means of jumper wires that are connected to the front side (after installation and connection of feeder and distribution cables) of the connector blocks. The jumper wires are run freely in the space between module runs (possibly retained by distribution rings), and are thus easy to reorganize.

Normally, the most frequent access will be to reorganize the jumper wires which alter the assignment of incoming pairs to outgoing pairs. However, access to alter feeder and distribution connections may still be had, although not as easily, by releasing a connector block, turning it around and severing the connections or altering them.

BRIEF DESCRIPTION OF THE DRAWINGS

Details of the present invention will become clearer in discussing the preferred embodiment, infra, in conjunction with the accompanying drawings, in which:

FIG. 2 is a side view of the module of FIG. 1 without any connector blocks;

FIG. 3 is an end view of the module of FIG. 1 without any connector blocks;

FIG. 4 is an outside view of a fanning strip according to the invention of FIG. 1;

FIG. 5 is an inside view of the fanning strip of FIG. 4;

FIG. 6 is a front edge view of the fanning strip of FIG. 4;

FIG. 10 is a plan view of a distribution ring as shown in FIG. 1;

FIG. 11 is an edge view of a distribution ring of FIG. 10;

FIG. 12 is a side view of a distribution ring of FIG. 10;

DESCRIPTION OF THE PREFERRED EMBODIMENT

Figure 1:
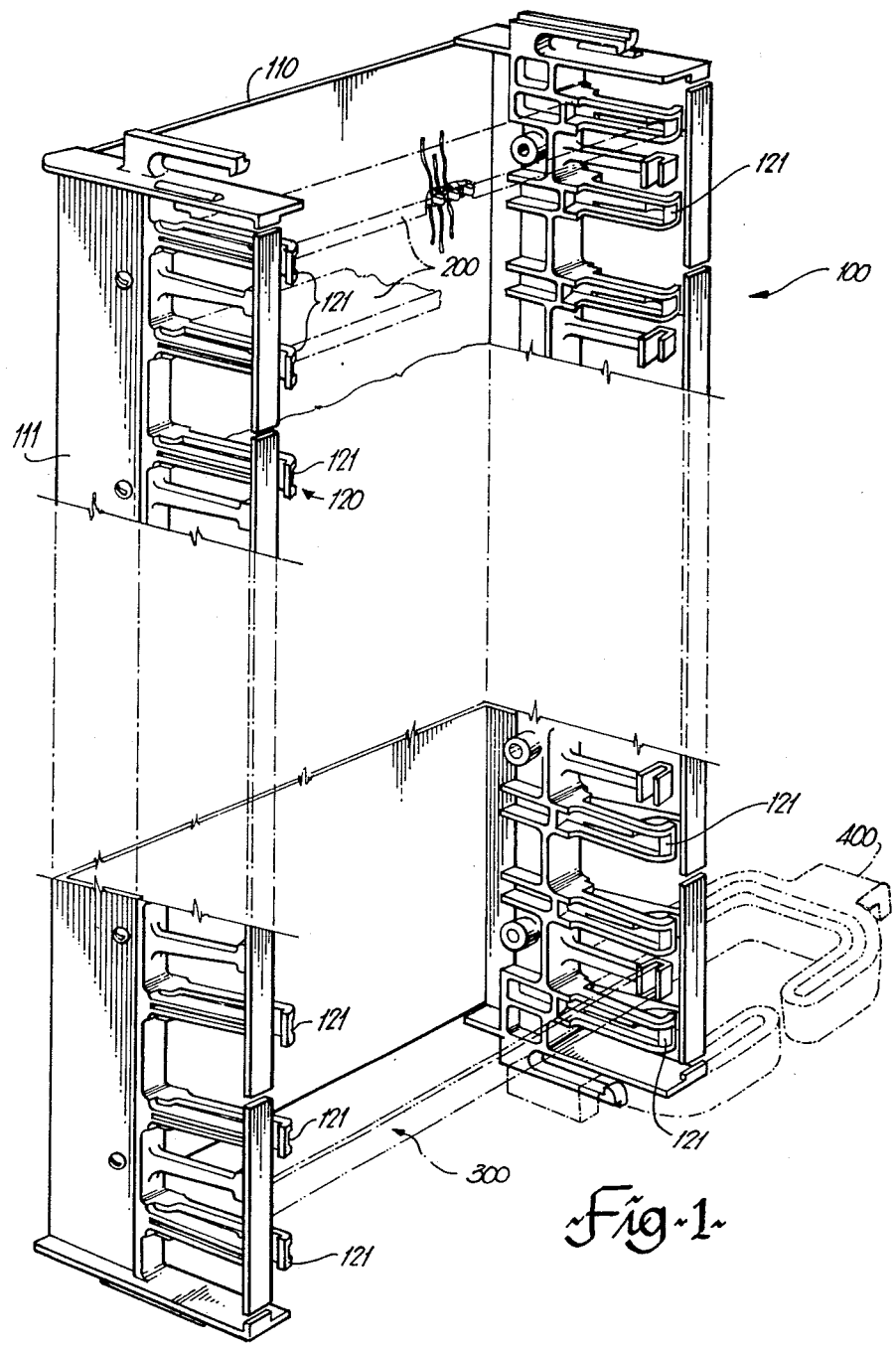
FIG. 1 is a perspective view of a module according to the invention.
Figure 9:
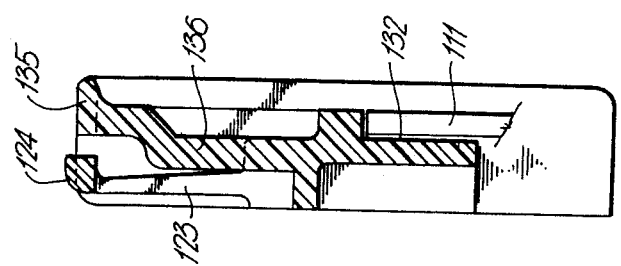
FIG. 9 is a cross sectional view along the line 9—9 of FIG. 4.
Figure 8:
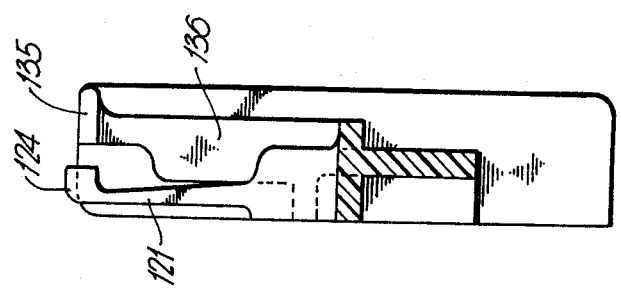
FIG. 8 is a cross sectional view along the line 8—8 of FIG. 4.
Figure 7:
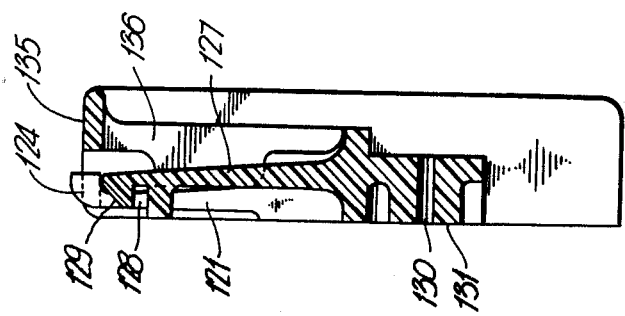
FIG. 7 is a cross sectional view along the line 7—7 of FIG. 4.
Figure 14:
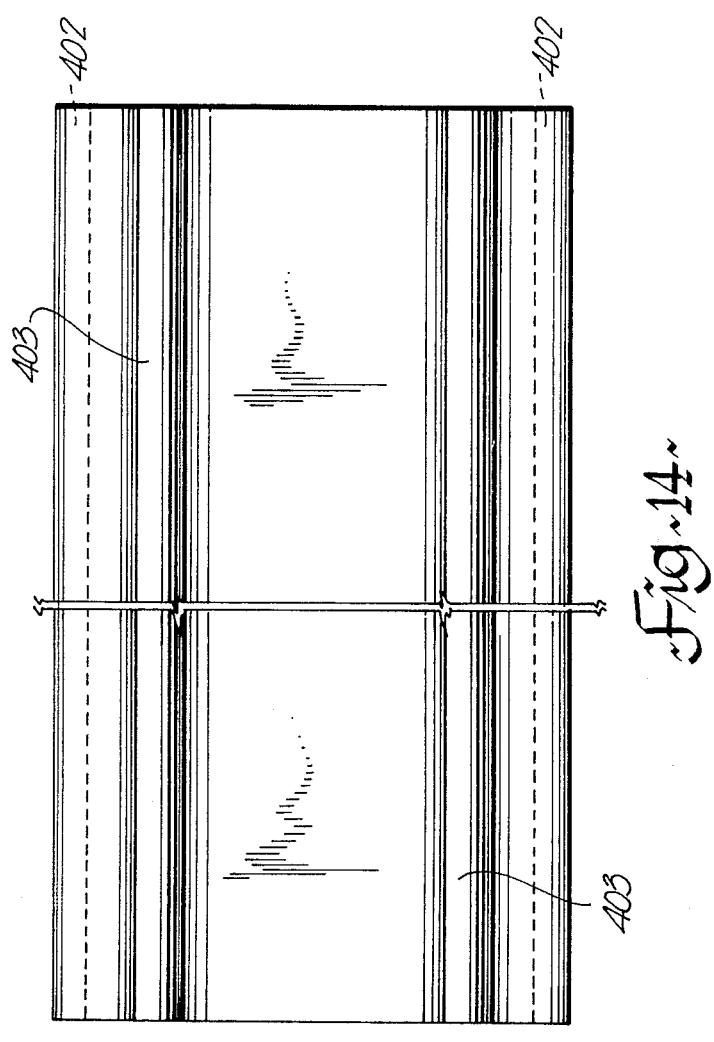
FIG. 14 is a plan view of a designation strip of FIG. 13.
Figure 13:
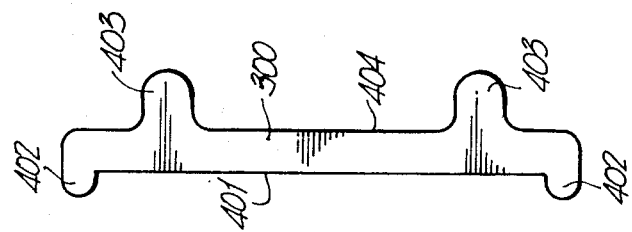
FIG. 13 is a cross sectional view of a designation strip according to the invention.

As illustrated in FIG. 1 the system of the invention comprises a module shown generally as 100, a series of connector blocks 200, a series of designation strips 300 and a distribution ring 400, the latter three shown in chain dot.

The module 100 comprises a base member 110 and a pair of opposed fanning strips 120 and 120'. The base member 110 as shown in FIG. 1 is a rectangular metal sheet, with edges 111 turned up to form a U-shaped channel like member on which the support members 120 and 120' are mounted. Appropriate mounting holes and stiffening ridges may be added to the base 110 as necessary.

The connector block 200 is mounted between the two support members 120 and 120' as are the designation strips 300 (See FIG. 1). There is one designation strip 300 for each two connector blocks 200.

The distribution ring 400 serves two basic purposes, firstly it provides path for wire and cable runs between adjacent module 100 and acts to space said adjacent modules for easy installation. Although only one distributing ring 400 is shown in FIG. 1, a ring 400 could be used at all four corners of the module 100 as needed.

The connector blocks 200 are held in place by cantilever spring retainers 121 integrally formed into the support members 120 and 120'. Each spring retainer 121 has a slot 122 for accepting the end of connector block 200. In the preferred form, the cantilever spring retainer comprises two spring legs 123 and 124 defining slot 122 and joined together by web 124' at their extremities to close off slot 122. For ease of installation of the connector block 200, the web 124' has a bevelled edge 125.

The designation strips 300 are held in place by spring retainers 126 having a single leg 127. Slot 128 receives the designation strip. For ease of insertion spring retainer 126 has a bevelled front edge 129.

The support members 120 shown in detail as FIGS. 4 to 9 are formed of a thermosetting plastic material. The support member 120 is mounted on the base 110 by means of mounting holes 130. Surrounding the mounting holes from the inner side (FIG. 5) are mounting blocks 131 into which self-tapping screws are inserted to hold the support member 120 to the base 110. The outer surface 132 which contacts the upturned edge 111 of the base 110 is recessed to provide accurate alignment of the support member 120 on the base 110.

The movement of the cantilever spring retainers 121 is restricted by stops 135 which are supported by legs 136 and 137. There is one stop 135 for each two spring retainers 121. A fanning aperture 138 is formed between legs 136 and 137 of adjacent stops 135. Wires can be inserted through gaps 139 between adjacent stops 135.

A latching hook 140 is provided at each end of the support members 120 for cooperating with a hook 301 on the distribution ring 400. (See FIGS. 10, 11 and 12.) A locking rib 141 bears on surface 302 to lock the distributing ring 300 in place.

An alignment groove 142 is provided on each latching hook 140 for cooperating with the similar groove 142 on an adjacent support member 120 when multiple modules are used.

The distributing ring 400 in FIGS. 10, 11 and 12 is a thermoplastic ring having gap 303 in its front edge for insertion of wires or cables into the ring. Mounting lugs 304 are provided for mounting the rings on a backing board. A groove 305 is provided on each surface of the ring 400 for two reasons, one is to provide the ring with a small amount of flexibility and to cut down on the amount of material needed in forming the ring 400.

The designation strip 300 is a basically flat extruded strip having the front surface 401 slightly recessed to accept an adhesive strip containing the necessary identifying information. Ribs 402 run along the front surface 401 on each edge. Stiffening ribs 403 run longitudinally along the rear surface 404.

Figure 15:
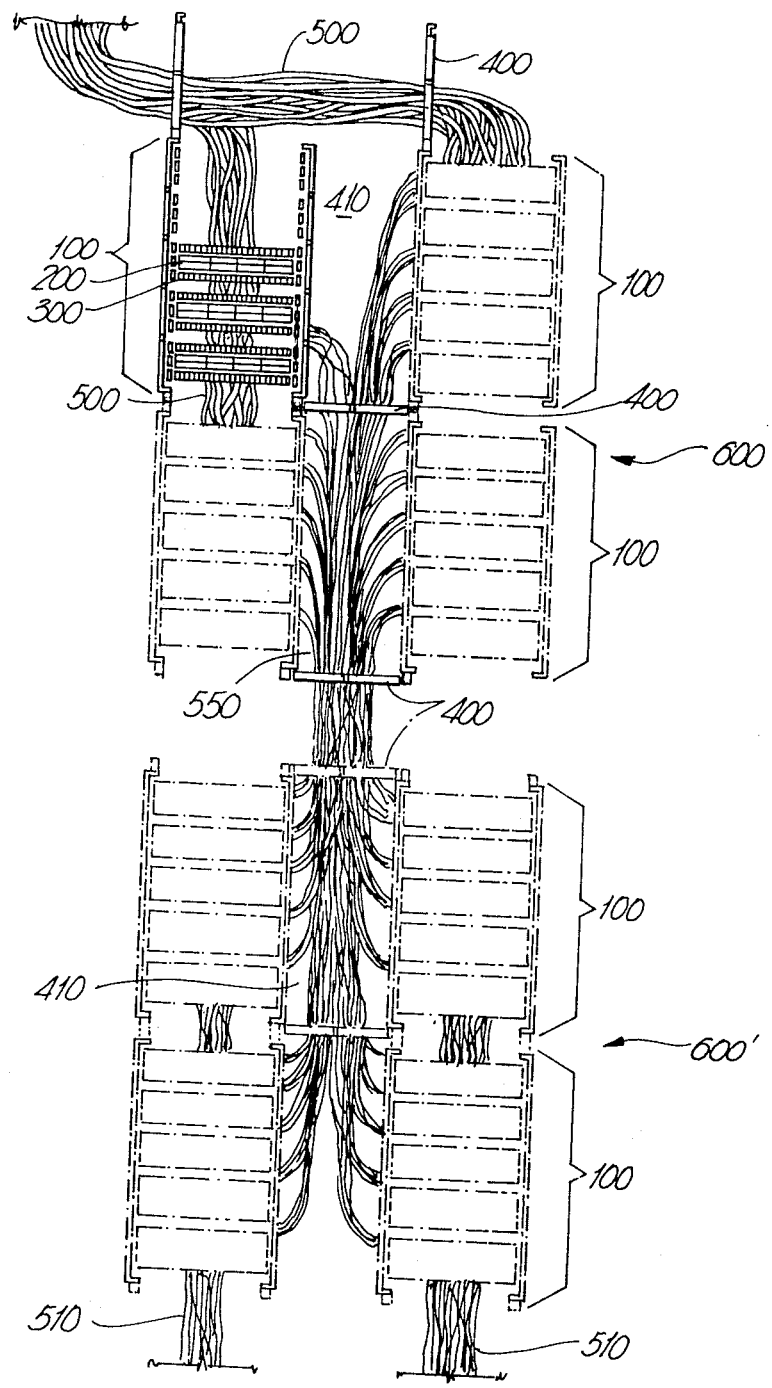
FIG. 15 is a plan view of an interconnect system according to the present invention.

FIG. 15 illustrates one example embodiment of a system for interconnection of multiple insulated wires according to the invention. While the figure illustrates eight modules, any number from one up would not be beyond the scope of the present invention.

Eight modules 100 are illustrated in two vertical rows of four modules each. Each module in the preferred embodiment supports 10 connector blocks 200 and 5 designation strips 300. Distribution rings 400 act as spacers between the adjacent rows of modules 200 forming a wiring channel 410. As well, distribution rings 400' are used as cable guides for incoming cables 500.

Incoming cables 500 access the connector blocks 200 from the rear through the channel formed in the space between the base and the connector blocks 200. The outgoing cables 510 also access the connector blocks 200 from the rear.

The incoming cables access the upper group 600 of modules while the outgoing cable accesses lower group of modules 600'. In this way an organized approach to the interconnection is possible.

Jumper wires 500 access the modules through the fanning apertures 138 from wiring channel 510 and in general run from a connector block in the upper group 600 of modules to a connector block in the lower group 600'.

A complete connection from a wire in an incoming cable 500 to an outgoing cable 510 includes the wire in the incoming cable 500 connected to a connector block 200 in the upper group 600, a jumper wire connected to the wire through the connector block, the jumper running from the upper group to the lower group through the wire channel to a connector block, the wire from the outgoing cable connects into the jumper via the connector block completing the connection.

What is claimed is:

1. A module for releasably supporting a plurality of connector blocks comprising a channel-like base member of sheet metal adapted to be secured to a flat surface, two molded plastic support members secured one to each side of the channel-like member and having fanning apertures for inserting wires for connection to connector blocks releasably held between said support members across said base member by means of paired, opposite, cantilever spring retainers in said support members.

2. A module as claimed in claim 1 further comprising designation strips interposed between connector blocks and retained by resilient cantilevers on either side of the support member.

3. A cable interconnect system comprising a plurality of modules as claimed in claims 1 or 2 arranged in rows and secured to a flat surface and having slotted distribution rings separating adjacent rows.

4. A cable interconnect system comprising a plurality of modules as claimed in claim 1 or 2 each of which further comprises designation strips interposed between connector blocks and retained by resilient cantilevers on either side of the support member, said plurality of modules arranged in rows and secured to a flat surface, each said module having a plurality of connector blocks and designation strips releasably held therein, said interconnect system having incoming and outgoing cables accessing said connector blocks through the base members, and said interconnect system having jumper wires guided between said rows and accessing said connector blocks through said fanning apertures.

5. A cable interconnect system comprising a plurality of modules as claimed in claim 1 or 2 each of which further comprises designation strips interposed between connector blocks and retained by resilient cantilevers on either side of the base member, said plurality of modules arranged in rows and secured to a flat surface, each said module having a plurality of connector blocks and designation strips releasably held therein, said interconnect system having incoming and outgoing cables accessing said connector blocks through the base members, and said interconnect system having jumper wires guided between said rows and accessing said connector blocks through said fanning apertures, said rows separated one from another by slotted distribution rings in an interlocking engagement with said modules.

6. A cable interconnect system having a plurality of modules, each of which capable of supporting a plurality of connector blocks, each comprising a channel-like base member, two support members one on each side of the channel for releasably supporting each one of said plurality of connector blocks across the base member in a forwardly spaced relationship with respect thereto, at least one of said two support members having fanning apertures therein for inserting wires for connection to said connector blocks, and designation strips interposed between connector blocks and retained by resilient cantilevers on either side of the base member, said plurality of modules arranged in rows and secured to a flat surface, each said module having a plurality of connector blocks and designation strips releasably held therein, said interconnect system having incoming and outgoing cables accessing said connector blocks through the base members, and said interconnect system having jumper wires guided between said rows and accessing said connector blocks through said fanning apertures, said rows separated one from another by slotted distribution rings in an interlocking engagement with said modules.

7. A cable interconnect system having a plurality of modules, each of which capable of supporting a plurality of connector blocks, each comprising a U-shaped base member adapted at its two opposite U-sides to releasably hold each of said plurality of connector blocks thereacross, having in at least one of said two opposite sides fanning apertures for inserting wires for connection to said connector blocks, and having designation strips interposed between connector blocks and retained by resilient cantilevers on either side of the base member, said plurality of modules arranged in rows and secured to a flat surface, each said module having a plurality of connector blocks and designation strips releasably held therein, said interconnect system having incoming and outgoing cables accessing said connector blocks through the base members, and said interconnect system having jumper wires guided between said rows and accessing said connector blocks through said fanning apertures, said rows separated one from another by slotted distribution rings in an interlocking engagement with said modules.

* * * * *